(12) United States Patent
Mueller et al.

(10) Patent No.: US 7,524,240 B2
(45) Date of Patent: Apr. 28, 2009

(54) DEVICE AND METHOD FOR THE MANUFACTURE OF A SAUSAGE SKEIN WITH ANY GEOMETRICAL EXTERNAL CONTOUR

(75) Inventors: Gerhard Mueller, Schemmerhofen (DE); Manfred Baechtle, Schemmerhofen (DE)

(73) Assignee: Albert H. Handtmann Maschinenfabrik GmbH & Co. KG, Biberach (DE)

( * ) Notice: Subject to any disclaimer, the term of this patent is extended or adjusted under 35 U.S.C. 154(b) by 346 days.

(21) Appl. No.: 11/451,895

(22) Filed: Jun. 13, 2006

(65) Prior Publication Data

US 2007/0026777 A1 Feb. 1, 2007

(30) Foreign Application Priority Data

Jun. 30, 2005 (EP) .................................. 05014221

(51) Int. Cl.
*A22C 11/00* (2006.01)
(52) U.S. Cl. ....................................................... 452/32
(58) Field of Classification Search ............. 452/21–27, 452/30–37, 46–48, 51; 426/140, 273, 105, 426/513, 516, 519, 92, 138, 241, 276, 277, 426/278, 284, 305; 99/516, 535, 470
See application file for complete search history.

(56) References Cited

U.S. PATENT DOCUMENTS

| | | | | |
|---|---|---|---|---|
| 5,273,481 A | * | 12/1993 | Sullivan | 452/24 |
| 5,989,609 A | * | 11/1999 | Kobussen et al. | 426/277 |
| 6,001,010 A | * | 12/1999 | Lamy | 452/32 |
| 6,146,674 A | * | 11/2000 | Manna et al. | 426/238 |
| 6,764,705 B2 | * | 7/2004 | Shefet | 426/513 |
| 7,195,551 B2 | * | 3/2007 | Shefet | 452/32 |
| 7,204,747 B2 | * | 4/2007 | Braig et al. | 452/32 |
| RE39,943 E | * | 12/2007 | Kobussen et al. | 452/30 |

FOREIGN PATENT DOCUMENTS

EP  1 371 293 A1  12/2003

OTHER PUBLICATIONS

Russian publication regarding "Aggregate for Forming Pralin Candy Centers and Candy Sticks" and English translation thereof (4 pages), bearing date of 1970.

* cited by examiner

*Primary Examiner*—Thomas Price
(74) *Attorney, Agent, or Firm*—Marshall, Gerstein & Borun LLP

(57) ABSTRACT

In order to manufacture a sausage skein of any geometrical external contour, a sausage-forming device has a coextrusion head for coextruding a paste mass and a casing enclosing the mass, wherein the extrusion head is provided with a filling tube for ejecting the paste mass and an extrusion die assigned to the filling tube with an extrusion gap for the casing material, wherein the filling tube exhibits, at least in the region of the ejection end, a cross-sectional shape deviating from the circular shape and the extrusion gap exhibits a cross-sectional shape deviating from the annular ring.

11 Claims, 4 Drawing Sheets

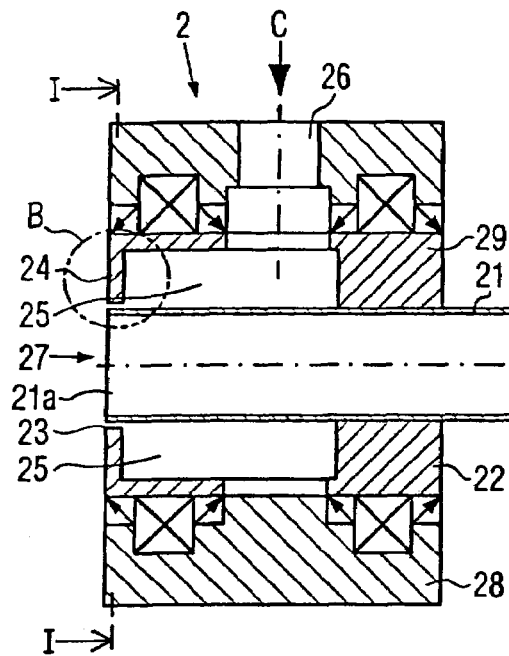
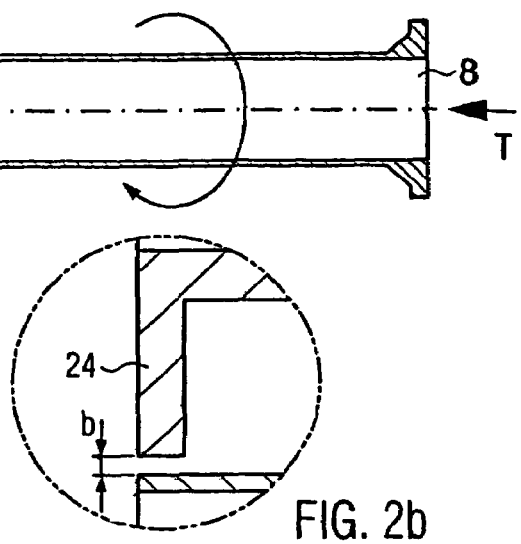
FIG. 2a
FIG. 2b
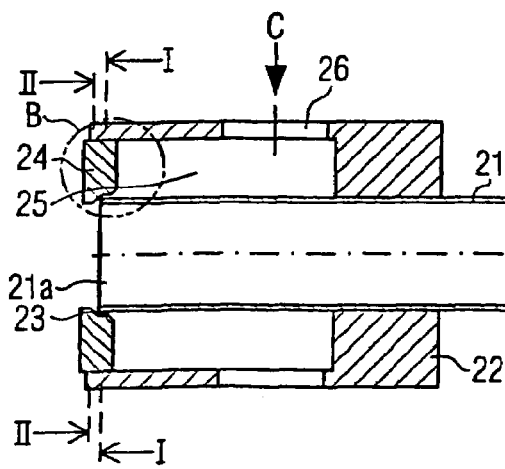
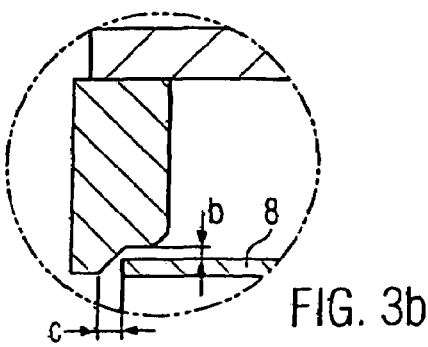
FIG. 3a
FIG. 3b

DEVICE AND METHOD FOR THE MANUFACTURE OF A SAUSAGE SKEIN WITH ANY GEOMETRICAL EXTERNAL CONTOUR

CROSS-REFERENCE TO RELATED APPLICATION

The present application claims the benefit of priority of European Patent Application No. 05014221.5 filed on Jun. 30, 2005. The entire text of the priority application is incorporated herein by reference in its entirety.

FIELD OF THE DISCLOSURE

The disclosure relates to a device for the manufacture of a sausage skein as well as a corresponding manufacturing method.

BACKGROUND OF THE DISCLOSURE

A device of this nature is already known from the publication EP 1371293. This publication shows a device for the manufacture of continuously produced sausage skeins with coextruded sausage casing and a cylindrical external contour. Here, an extrusion head, which comprises a filling tube for the sausage mass and an extrusion die for the casing material, is used to coextrude the paste mass with a casing enclosing the mass into a skein shape.

Once the product skein leaves the extrusion head, the coextruded sausage casing must be consolidated. To do this, the coextruded sausage casing is, for example, subjected to a saline solution.

The known methods for the manufacture of sausages with a continuously produced endless sausage skein and coextruded sausage casing are in this respect based on the shape provided by the traditional manufacture of sausages with pre-prepared casings (e.g. casing sleeves of plastic or collagen casing material).

Previously, it was not possible to produce a sausage skein with a freely definable external contour geometry with coextrusion heads of this nature in one manufacturing stage. If, for example, Landjäger sausages with a square cross-sectional shape are manufactured, they were previously brought into the rectangular shape in a subsequent process stage.

SUMMARY OF THE DISCLOSURE

It is therefore the object of the disclosure to provide a device and a method which facilitate in a simple manner the manufacture of a sausage skein with coextruded sausage casing and any geometrical outer contour.

Since, according to the disclosure, the paste mass is ejected through an ejection end of the filling tube with a crass-sectional shape deviating from a circular shape and at the same time the casing enclosing the mass is extruded in a suitable shape around the paste mass, a sausage skein can be manufactured in a simple manner with any geometrical external contour. Consequently, the former following process stage, in which a sausage skein with a cylindrical outer contour is brought into another shape, for example a square shape, can be omitted, wherein the manufacture can be simplified and speeded up and in addition less equipment is needed, because no additional device is needed for shaping. Only one extrusion head is needed, whose filling tube and extrusion die comprise an ejection end, the cross-sectional shape of which deviates from the circular shape. A sausage skein contour of any cross section can be manufactured in a simple manner by shaping the coextrusion head.

According to a preferred embodiment of the device according to the disclosure, the extrusion die is arranged around the ejection end of the filling tube such that the extrusion gap forms between the filling tube and a wall of the extrusion die; through this arrangement space and material can be saved, because the wall of the filling tube can define the die cavity which is connected to the mass feed for the casing material.

In an advantageous manner the extrusion gap between the filling tube and the wall of the extrusion die, i.e. at the exit point, is equally wide over the complete circumference. Consequently, the production of a uniform casing is ensured.

With the device according to the disclosure triangular, quadriform, n-sided, oval or irregularly shaped external contours of the sausage skeins can, for example, be formed.

It is advantageous if the filling tube and the extrusion die can be moved axially relative to one another in order to set the width of the extrusion gap. Thus, sausage casing masses with different consistencies and sausage casings of various thicknesses can be processed.

The thickness of the sausage casing can also be set by adjusting the feed of the casing material by pressure or quantity control.

Advantageously, the extrusion die is rotationally supported together with the filling tube.

Thus the extrusion head can rotate with respect to the already ejected sausage skein, so that sausages can be manufactured with an external contour which deviates from the cylindrical external contour, and which in addition are rotated about their longitudinal axis, leading to a particularly attractive shape of the produced sausages.

BRIEF DESCRIPTION OF THE DRAWINGS

The disclosure is explained in more detail in the following with reference to the accompanying figures. The following are illustrated:

FIG. 2a shows a cross section through a first embodiment of an extrusion head according to the disclosure.

FIG. 2b shows an enlargement of the detail B shown in FIG. 2a.

FIG. 3a shows a cross section through another embodiment of an extrusion head according to the disclosure.

FIG. 3b shows an enlargement of the detail B in FIG. 3a.

FIG. 6 schematically shows a cross section along the line II-II in FIG. 3a.

DETAILED DESCRIPTION OF THE DISCLOSURE

Figure 1:
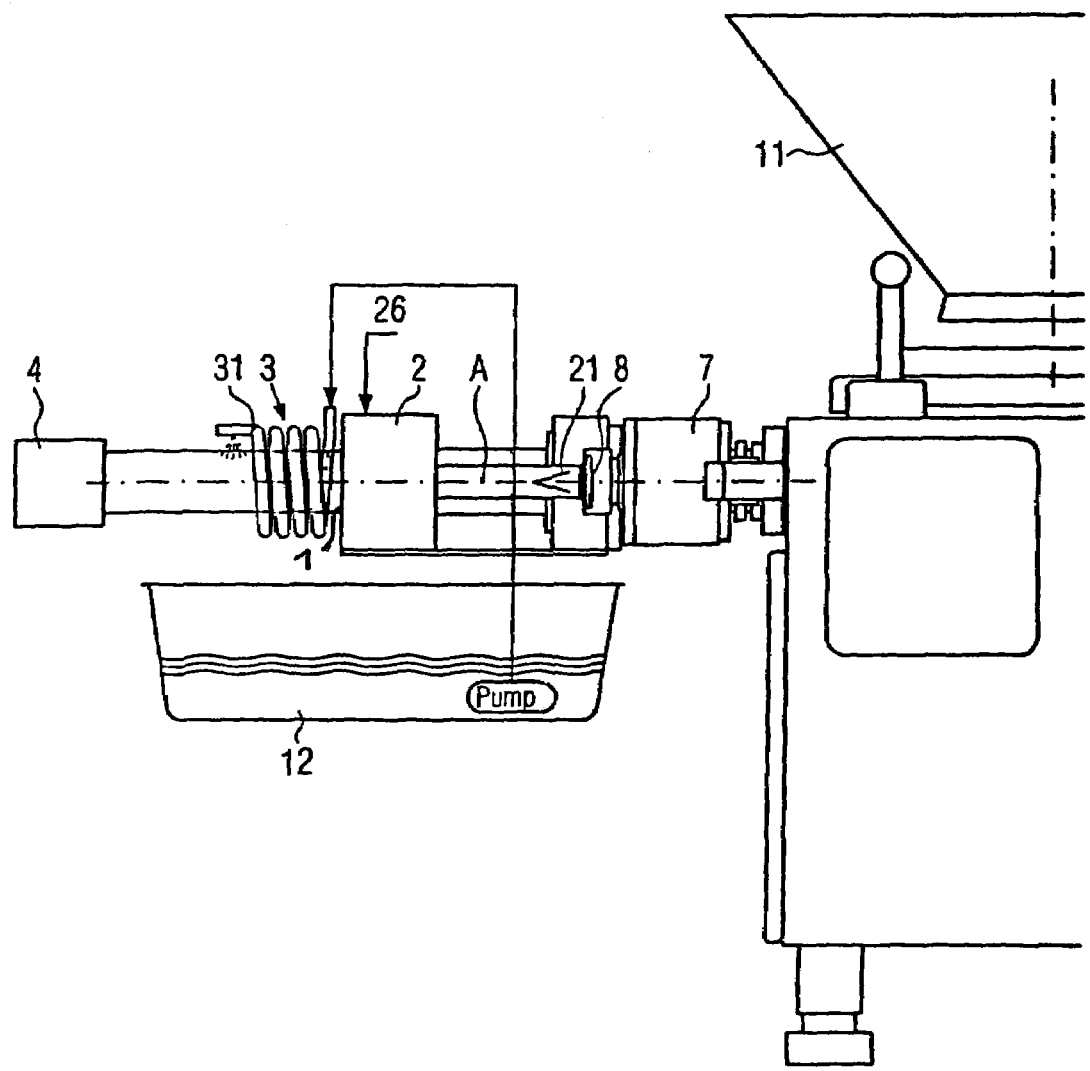
FIG. 1 shows a schematic representation of the device according to the disclosure.

As shown in FIG. 1, the device comprises a storage container 11, via which a paste mass, such as for example sausage meat, can be fed to the filling tube 21. The sausage meat is introduced into the filling tube 21 under pressure through an opening 8 and fed to the extrusion head 2. The extrusion head 2 is joined to a feed 26 (refer also to FIGS. 2 and 3) for an external mass (e.g. alginate), i.e. for the easing material. In the extrusion head 2 simultaneously the paste mass can be fed in the transport direction T and the casing material passed through the feed 26 as external mass. FIG. 1 also shows that the coextruded sausage skein (1) emitted from the extrusion head 2 passes through a device following the extrusion head 2 for consolidating the casing material 3. In this embodiment the consolidating device 3 is formed by the annular spray 31 through which the sausage skein can be passed. The annular spray 31 is connected to a feeding device for a saline solution which is fed by means of a pump from a further storage container 12 to the annular spray 31. Once the sausage skein leaves the consolidating device 3 the sausage skin exhibits a high stability.

In the conveying direction after the consolidating device 3 different devices 4 can follow which are not explained in further detail in this application. For example, a twisting device can be provided which twists the produced sausage skein about the longitudinal axis A, or a parting unit, which for example parts the paste mass for subdividing the sausage skein into single sausages and/or a conveying device which conveys the produced sausage skein or the single sausages further in the transport direction T.

With the embodiment shown in FIG. 1 the filling tube can be rotated together with the coextrusion head about the axis A, for example by the drive unit 7. The filling tube 21 can be just as well arranged for rotation with the extrusion head 2 without a drive or it can however be installed fixed and not for rotation.

Figure 4:
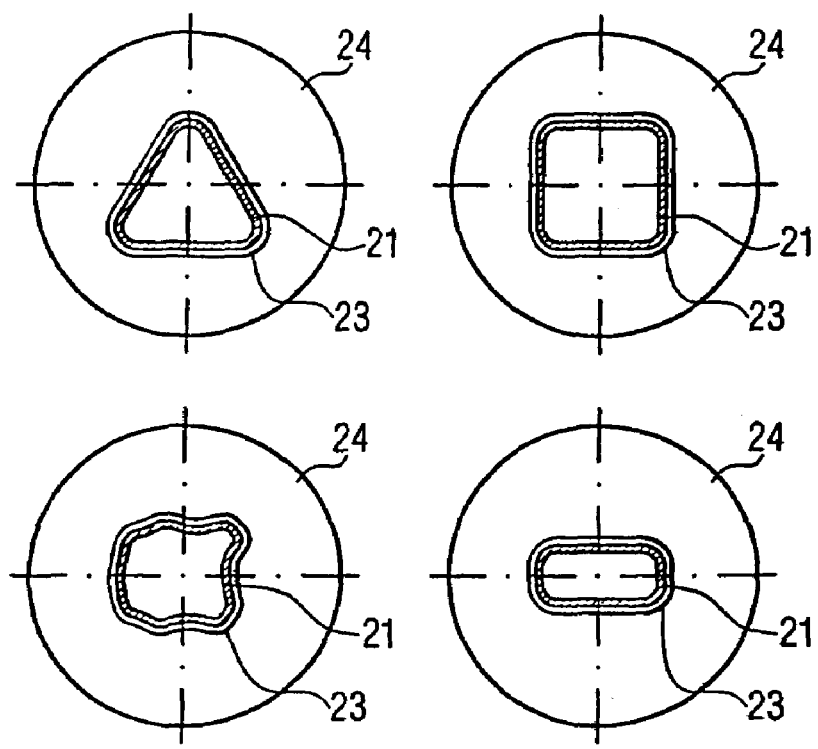
FIG. 4 schematically shows a cross section along the line I-I in FIGS. 2a and 3a for four extrusion heads with different design.

In conjunction with FIG. 4, FIGS. 2a and 2b show an embodiment of the disclosure. The extrusion head 2 shown in FIG. 2a here comprises at least the end section of the filling tube 21, which at its ejection end 21a ejects the paste mass, and an extrusion die 22 for the casing material. In this embodiment the extrusion die 22 is arranged about the filling tube 21 such that the extrusion gap 23 for the casing material is formed between the filling tube 21 and a wall 24 of the extrusion die 22. The wall 24 is here situated in the region of the ejection end 21a of the filling tube. In this embodiment the wall 24 essentially terminates with the ejection end of the filling tube 21 and the extrusion gap 23, at which the casing material is emitted, extends essentially radially to the longitudinal axis A of the filling tube 21. The die cavity 25, which is connected to the feed 26 for the casing material, is bounded on one side by the extrusion die 22, i.e. by its walls 24 and 29 and by the filling tube 21. The filling tube 21 and the extrusion die 22 make contact in the region 29 of the wall. With this embodiment the extrusion die 22 is rotationally supported together with the filling tube 21 in a housing 28 about the axis A so that the filling tube 21 can be rotated together with the die 22, which is represented by the arrow. As can be seen from FIG. 2b, the extrusion gap 23, i.e. here the distance between the filling tube and the extrusion die 22, exhibits a width b. Through the gap 23 the casing material can be extruded such that it surrounds the paste mass ejected from the filling tube 21 for producing the sausage skein. In doing this, the casing material can be guided along the at the direction C, whereas the paste mass is guided along the arrow direction T.

Figure 5:
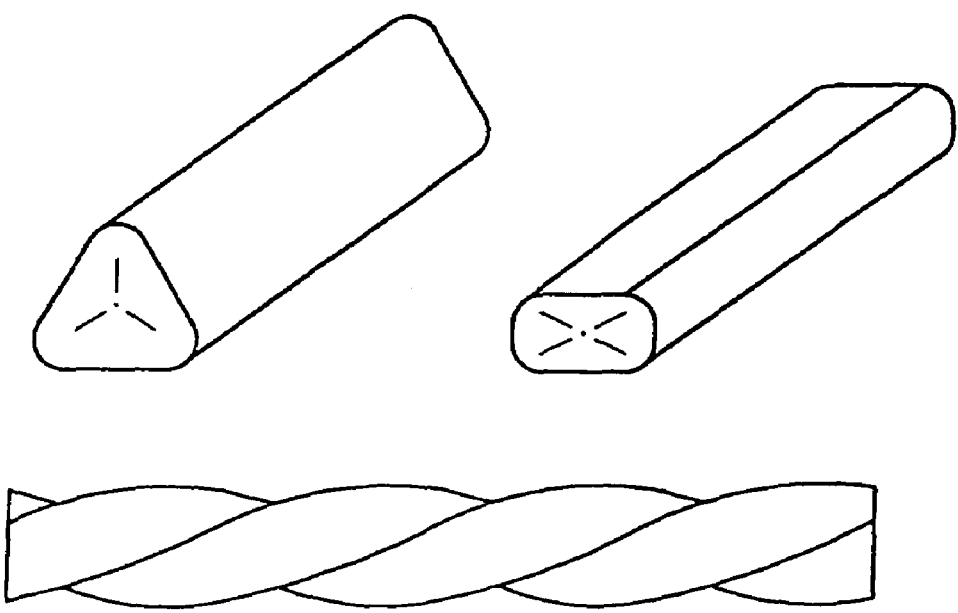
FIG. 5 shows a perspective view of parted sausages with different external contours.

According to the disclosure the cross section of the filling tube 21 comprises at least in the region of the ejection end 21a a cross-sectional shape deviating from the circular shape, as can be seen for example from FIG. 4. The filling tube 21 exhibits an external contour, which in cross section deviates from the circular shape, as well as a suitably shaped internal contour so that the paste mass can be ejected in the appropriate shape. In FIG. 4 triangular, square-shaped, quadriform and irregular shapes of the filling tube 21 are shown as examples. The internal and external contours of the filling tube 21 exhibit the same concentric shape. Either the complete filling tube 21 can be appropriately shaped or, however, only the part facing the ejection end 21a of the filling tube, which for example can be fitted, in particular pushed, onto an already existing cylindrical filling tube. The cross-sectional shapes are not restricted to the cross-sectional shapes shown in FIG. 4, but rather can exhibit any irregular, asymmetrical or n-sided shape. As can be seen from FIG. 4, the gap 23 also exhibits a cross-sectional shape corresponding to the cross section of the filling tube 21. Here also, the circumferential extrusion gap 23 has a cross-sectional shape deviating from the annular ring. The width b is constant over the complete circumference of the extrusion gap 23. Thus the casing can be manufactured exactly with constant thickness. Moreover, the region 24 of the extrusion die 22, which together with the filling tube 21 forms the extrusion gap 23, comprises an opening which exhibits a cut-out shaped essentially complementary to the shape of the filling tube 21, which can accommodate the filling tube 21 so that the extrusion gap 23 can be formed between the filling tube 21 and the extrusion die 22, i.e. here the wall 24. Through an embodiment of the extrusion head 2 of this nature a sausage skein with any external geometry can be formed. FIG. 5 shows sausage skeins 1 formed in this way which comprise a non-cylindrical external contour.

FIG. 3 shows a further embodiment according to the disclosure which essentially corresponds to the embodiment shown in FIG. 2a. For the sake of simplicity, FIG. 3 does not show any housing in which the extrusion die 22 is rotationally supported, but also in this embodiment the extrusion die 22 could be rotationally supported together with the filling tube 21 about the axis A. The essential difference between the extrusion heads shown in FIGS. 2 and 3 is that here part of the extrusion die 22, i.e. here the wall 24, extends over the ejection end 21a of the filling tube 21. Here the wall 24 is, for example, formed as an annular disc. The extrusion gap 23 thus formed between the extended region of the wall 24 and the ejection end of the filling tube 21, that is the exit gap, extends, as shown in FIG. 3 and as can be seen particularly from FIG. 3b, parallel to the longitudinal axis A of the filling tube and here exhibits a gap width c. Also here the distance c between the filling tube 21 and the extrusion die 22 is constant over the complete circumference of the gap so that a homogeneous ejection of the casing material is possible. Preferably the distance b between the filling tube and extrusion die 22 perpendicular to the axis A is also constant over the circumference. Dimension b and dimension c (or all other distance dimensions) do not need to be equal, but each one should be constant on the circumference.

Figure 6:
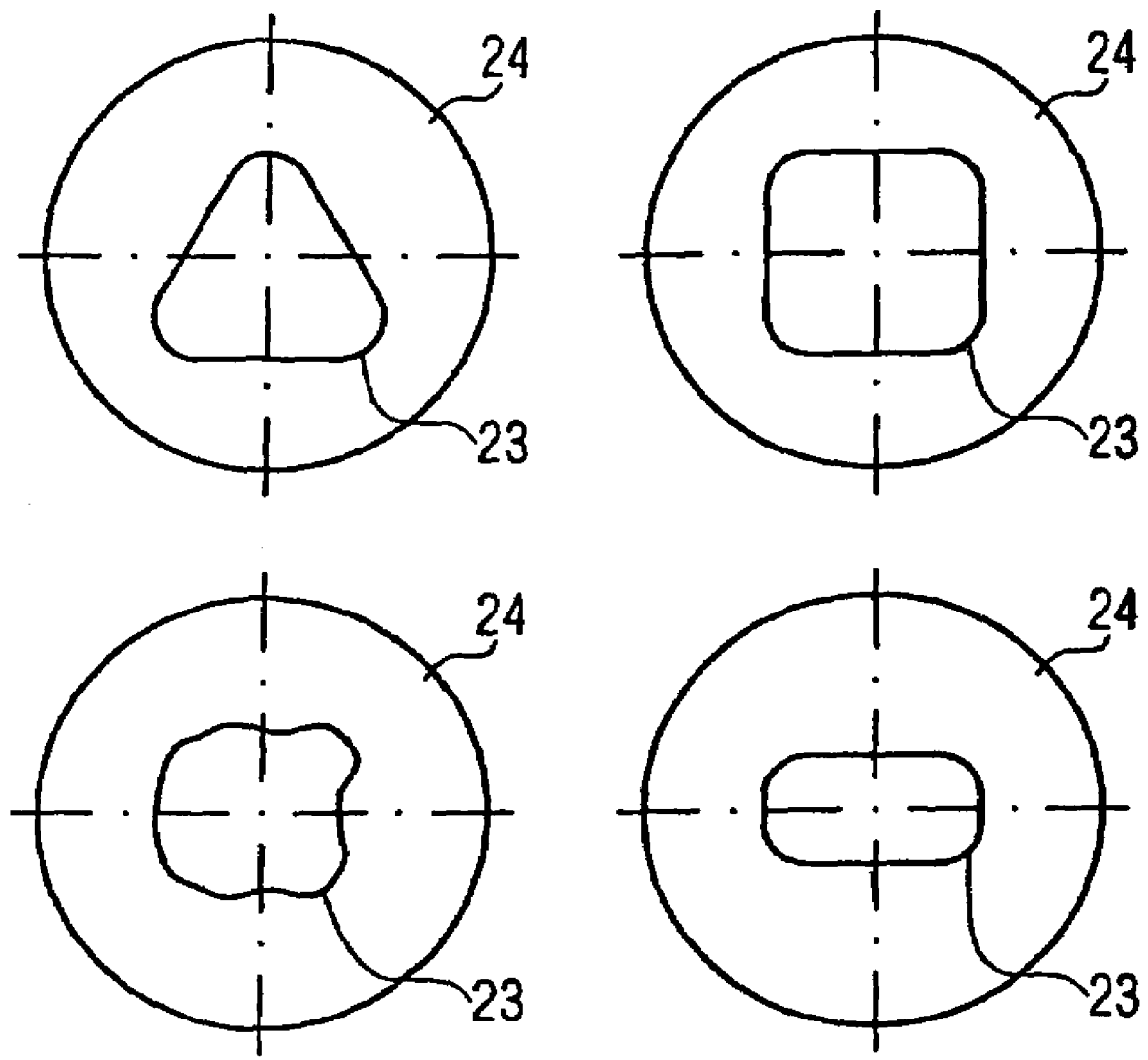

In a similar manner as with the embodiment shown in FIG. 2, the filling tube comprises, as can also be seen from FIG. 4, at least in the region of the ejection end 21a, a cross-sectional shape deviating from the circular shape. Also here the part of the extrusion die 22, which together with the filling tube 21 forms the extrusion gap 23, here for example the annular disc 24, has essentially a complementary shaped recess so that the filling tube can be pushed far into the extrusion die 22 such that a desired gap width c in the axial direction between the filling tube 21 and the wall 24 arises and furthermore also in the radial direction an adequate distance between the filling tube 21 and the overhanging region 24 of the extrusion die 22 arises so that casing material can be emitted from the cavity 25 between the filling tube 21 and the wall 24. FIG. 6 shows a section along the line II-II of, FIG. 3a, wherein the cross-sectional shape of the gap can be clearly seen deviating from the circular shape. Advantageously therefore, the filling tube 21 and the extrusion die 22 can be moved with respect to one another in the axial direction, i.e. along the axis A of the filling tube. Thus, sausage casing masses with different consistencies can be processed and sausage casings of various thicknesses produced. Through the axial relative movement between the extrusion die 22 and the filling tube 21 the width c of the extrusion gap 23, i.e. the exit gap, also retains its constant dimension around the circumference.

Different thicknesses of the sausage casing can also be obtained in that the feed of the sausage casing mass is changed by pressure or quantity control.

With the method according to the disclosure in contrast to the state of the art, a sausage skein with a non-circular cross-sectional shape is produced in that the paste mass is ejected through an ejection end of the filling tube in a cross-sectional shape deviating from the circular shape and simultaneously a casing enclosing the mass is ejected in a corresponding shape around the paste mass. In doing this, casing material is extruded through the extrusion gap 23, i.e. the exit gap of the extrusion die 22, onto the ejected paste mass through a feed 26 and a cavity 25 in the extrusion die 22. Since the extrusion gap exhibits a shape, which in cross section, i.e. perpendicular to the axis A, comprises a shape corresponding to the ejected paste mass, the ejected casing material also has a corresponding complementary shape and can surround the ejected filler so exactly that a sausage can be manufactured with any geometrical external contour. The sleeve material then, as previously described, only needs to be consolidated by the consolidating device 3.

According to a particular embodiment of the disclosure the filling tube 21 is rotationally supported together with the extrusion die 22 about the axis A. In this way the extrusion head can be rotated with respect to the sausage skein already produced by a drive device 7 about the axis A and the twisted sausage skein can be held against rotation by a transport device, not illustrated and arranged in the transport direction. The filling tube and the extrusion device 2 can however also be arranged fixed, wherein then an arrangement for rotating the skein about the axis A can be positioned in the transport direction of the paste filler after the consolidating device 3. Thus the produced sausage skein, which has a cross-sectional shape deviating from the cylindrical shape, can be twisted about the longitudinal axis so that for example, as shown in FIG. 5, a twisted sausage can be produced, which exhibits a particularly attractive shape. The consolidation of the sausage skein then takes place before and during the twisting.

The disclosure is not only suitable for sausage products and it can also be used for producing other foodstuffs, e.g. cheese, etc.

We claim:

1. Device for the manufacture of a sausage skein (1) from a paste mass, in particular sausage meat, comprising
   a coextrusion head (2) for coextruding the paste mass and a casing enclosing the mass,
   the coextrusion head (2) having a filling tube (21) for the ejection of the paste mass and an extrusion die (22) assigned to the filling tube (21) with an extrusion gap (23) for ejecting the casing material,
   the filling tube (21) being at least in the region of the ejection end (21a) a cross-sectional shape deviating from the circular shape and the extrusion gap (23) being a corresponding cross-sectional shape deviating from the circular shape,
   wherein the extrusion die (22) is rotationally supported together with the filling tube (21).

2. Device according to claim 1, wherein the extrusion die (22) is arranged around the ejection end (21a) of the filling tube (21) such that the extrusion gap (23) is formed between the filling tube (21) and a wall (24) of the extrusion die (22).

3. Device according to claim 2, wherein the extrusion gap (23) between the filling tube (21) and the wall (24) exhibits the same width (b, c) over the complete circumference.

4. Device according to claim 1, wherein the cross-sectional shape of the filling tube is one of triangular, quadriform, n-sided, oval and irregular.

5. Device according to claim 1, wherein the filling tube (21) and the extrusion die (22) can be moved axially relative to one another for adjusting the width of the extrusion gap (23).

6. Method for the manufacture of a sausage skein (1) from paste mass with a non-circular cross-sectional shape, comprising
   ejecting the paste mass through a filling tube (21) with, at least in the region of the ejection end, a cross-sectional shape deviating from the circular shape,
   simultaneously extruding a casing enclosing the mass through an extrusion die (22) in a corresponding shape around the ejected paste mass,
   adjusting the thickness of the casing by one of setting the width of an extrusion gap (23) of the extrusion die (22) or through feeding the casing by one of pressure or quantity control, and
   consolidating the enclosing casing.

7. Method according to claim 6, and twisting the produced sausage skein (1) about its longitudinal axis A.

8. Device for the manufacture of a sausage skein (1) from a paste mass, in particular sausage meat, comprising
   a coextrusion head (2) for coextruding the paste mass and a casing enclosing the mass,
   the coextrusion head (2) having a filling tube (21) for the ejection of the paste mass and an extrusion die (22) assigned to the filling tube (21) with an extrusion gap (23) for ejecting the casing material,
   the filling tube (21) being at least in the region of the ejection end (21a) across-sectional shape deviating from the circular shape and the extrusion gap (23) being a corresponding cross-sectional shape deviating from the circular shape,
   wherein the filling tube (21) and the extrusion die (22) can be moved axially relative to one another for adjusting the width of the extrusion gap (23).

9. Device according to claim 8, wherein the extrusion die (22) is arranged around the ejection end (21a) of the filling tube (21) such that the extrusion gap (23) is formed between the filling tube (21) and a wall (24) of the extrusion die (22).

10. Device according to claim 9, wherein the extrusion gap (23) between the filling tube (21) and the wall (24) exhibits the same width (b, c) over the complete circumference.

11. Device according to claim 8, wherein the cross-sectional shape of the filling tube is one of triangular, quadriform, n-sided, oval and irregular.

* * * * *

UNITED STATES PATENT AND TRADEMARK OFFICE
CERTIFICATE OF CORRECTION

PATENT NO. : 7,524,240 B2 Page 1 of 1
APPLICATION NO. : 11/451895
DATED : April 28, 2009
INVENTOR(S) : Gerhard Mueller et al.

It is certified that error appears in the above-identified patent and that said Letters Patent is hereby corrected as shown below:

On the Title Page:

At Item (30), "05014221" should be -- 05014221.5 --.

In the Claims:

At Column 6, line 42, "across-sectional" should be -- a cross-sectional --.

Signed and Sealed this

Eighteenth Day of August, 2009

David J. Kappos
*Director of the United States Patent and Trademark Office*